United States Patent [19]

Leedom

[11] 4,040,635
[45] Aug. 9, 1977

[54] RELEASABLE STYLUS ARM MAGNETIC COUPLING

[75] Inventor: Marvin Allan Leedom, South Brunswick Township, Middlesex County, N.J.

[73] Assignee: RCA Corporation, New York, N.Y.

[21] Appl. No.: 667,388

[22] Filed: Mar. 16, 1976

[30] Foreign Application Priority Data

Sept. 18, 1975 United Kingdom ............... 38458/75
Nov. 28, 1975 United Kingdom ............... 49109/75

[51] Int. Cl.² .......................... G11B 3/02; H01F 7/20
[52] U.S. Cl. .............................. 274/37; 179/100.1 B; 335/285; 358/128
[58] Field of Search ............ 274/37, 38, 23 R, 23 A; 178/6.6 R, 6.6 A, 6.6 DD; 335/285; 358/128; 179/100.1 B

[56] References Cited

U.S. PATENT DOCUMENTS

| 3,282,328 | 11/1966 | Mushru et al. | 335/285 |
| 3,917,903 | 11/1975 | Taylor et al. | 274/37 |
| 3,952,147 | 4/1976 | Leedom | 274/23 A |

Primary Examiner—Steven L. Stephan
Attorney, Agent, or Firm—Eugene M. Whitacre; William H. Meagher; Dilip A. Kulkarni

[57] ABSTRACT

A pickup cartridge for a video disc player encloses a stylus arm unit comprising a stylus arm carrying a stylus at one end and a magnetizable connector plate secured at its other end. A permanent magnet is centrally located in a recess provided in a magnetizable support member which is mounted in a carriage of the player. When the connector plate is engaged with the support member, the separation between the connector plate and the permanent magnet is greater than the separation between the permanent magnet and the walls defining the recess.

5 Claims, 13 Drawing Figures

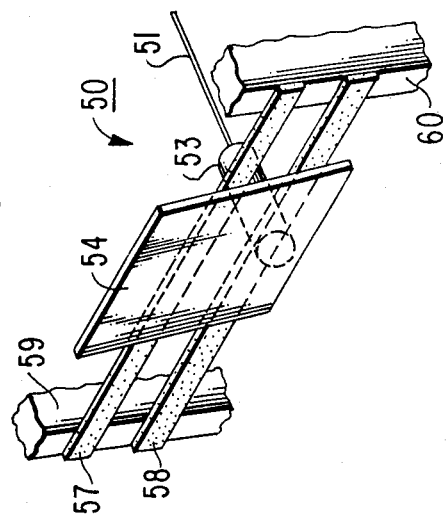
Fig. 2.
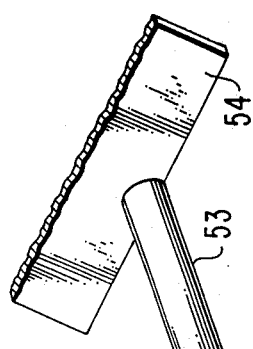
Fig. 3.
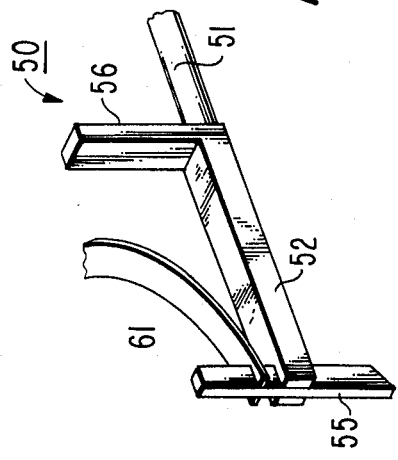
Fig. 6.
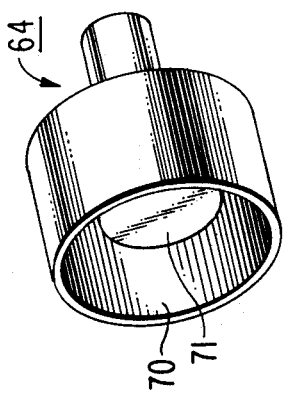
Fig. 4.
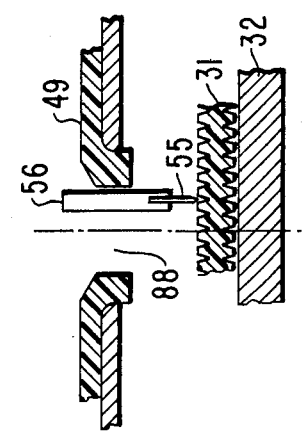
Fig. 5a.
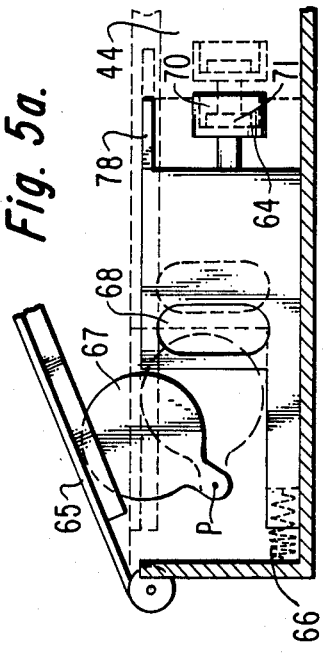
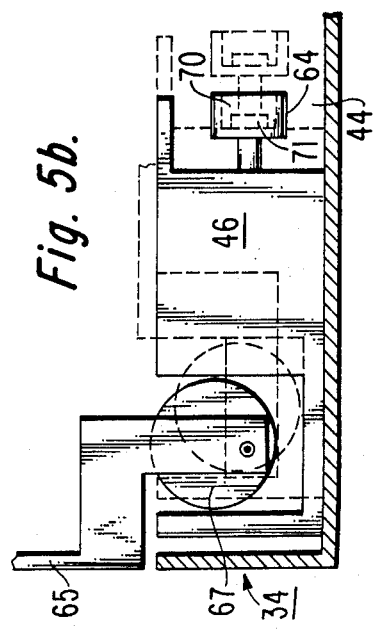
Fig. 5b.

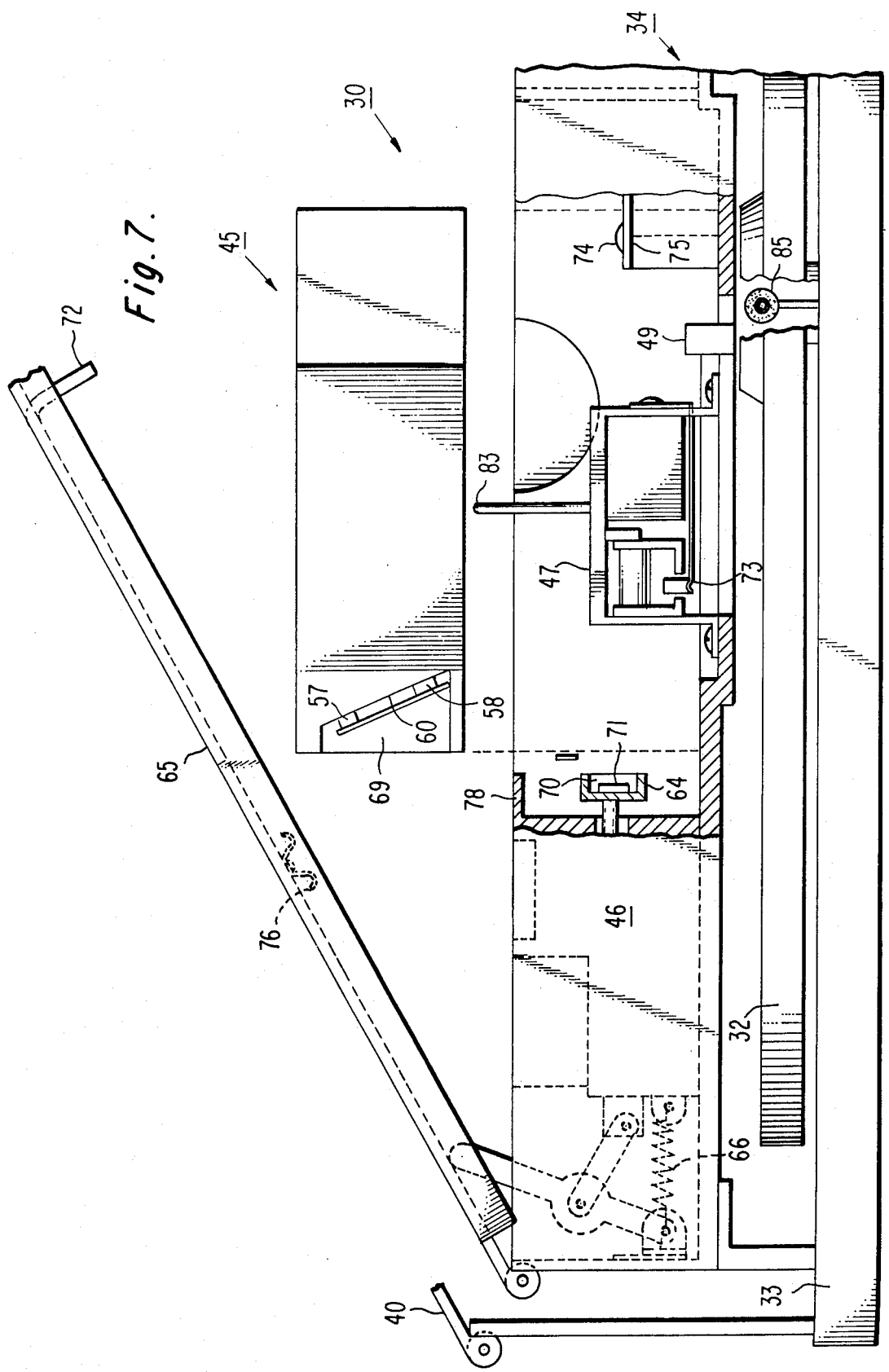

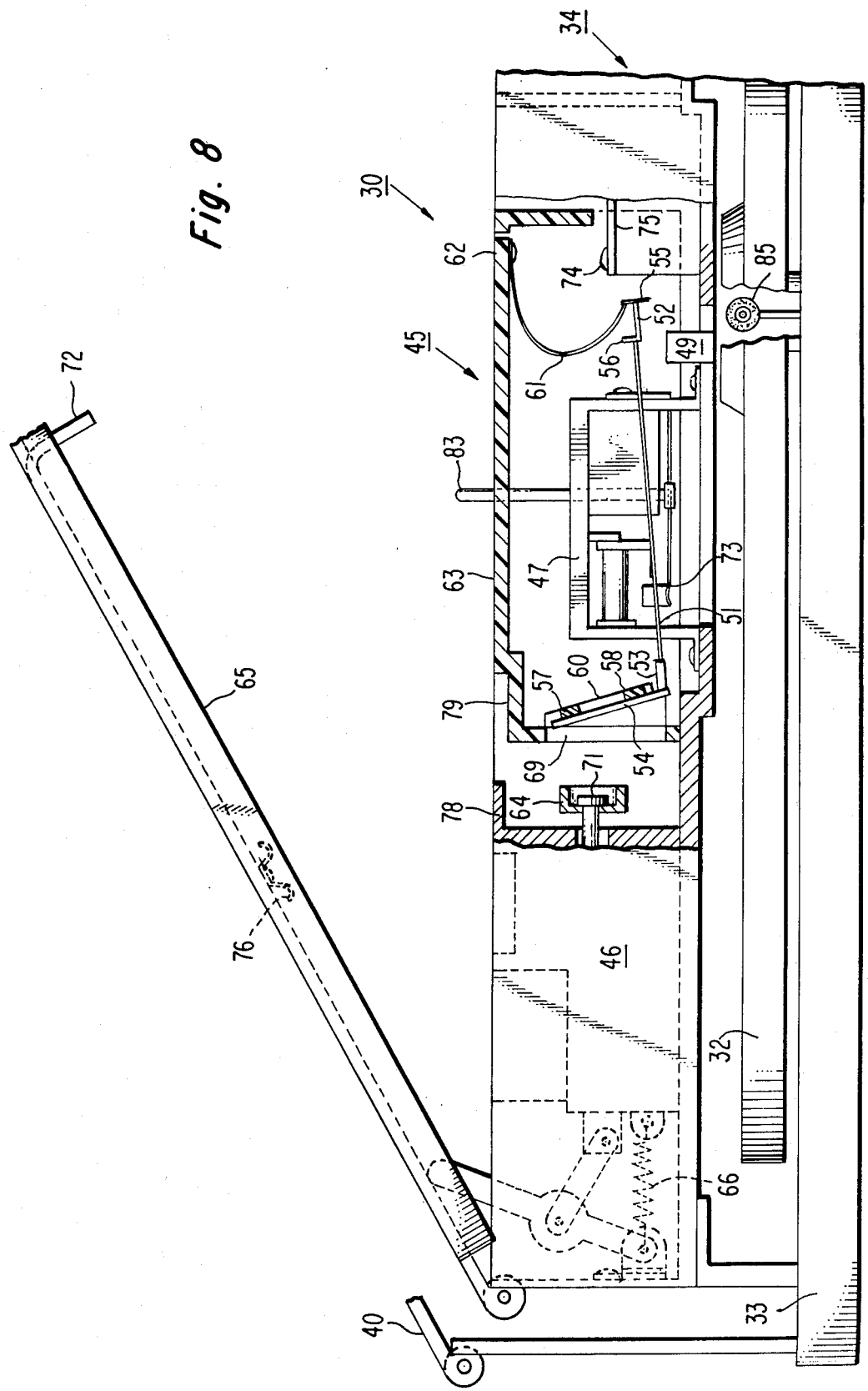

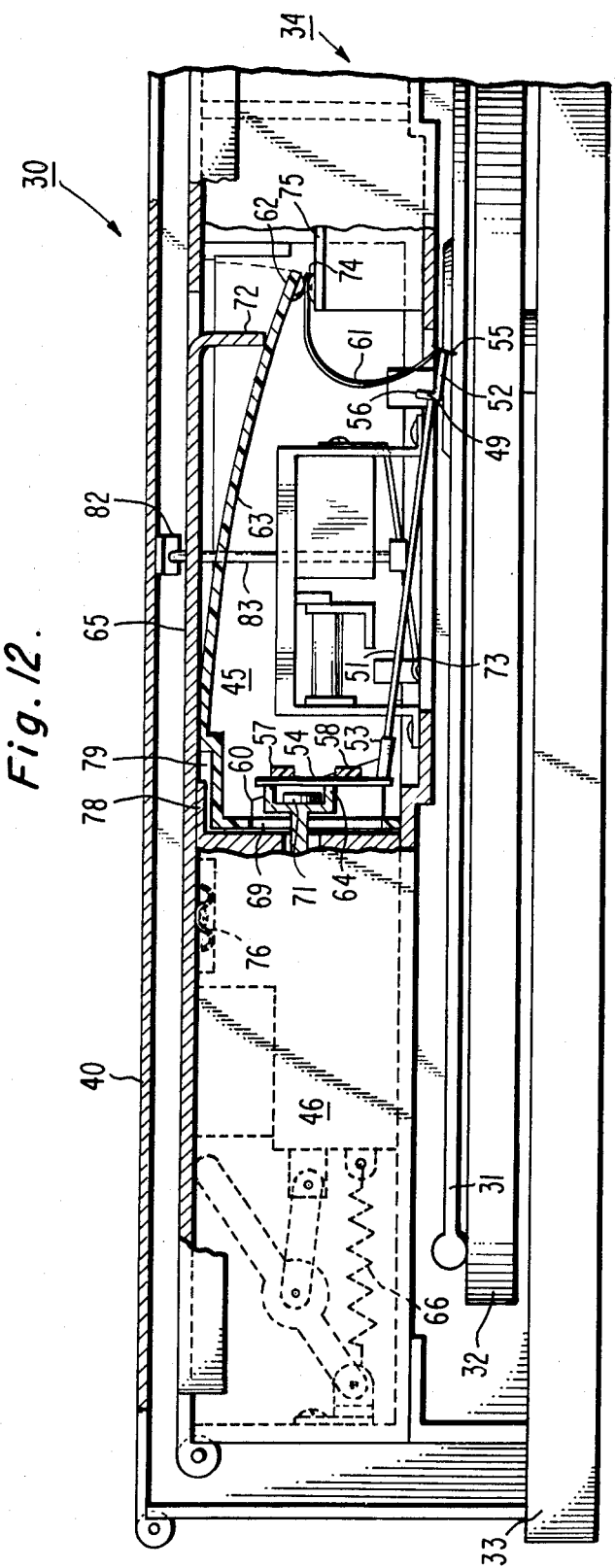

RELEASABLE STYLUS ARM MAGNETIC COUPLING

The invention generally relates to a video disc player, and more particularly, to a releasable magnetic coupling between a connector plate of the stylus arm unit and a support member of the player.

In the U.S. Pat. No. 3,917,903 (Taylor, et al.), A magnetic coupling for detachably securing a stylus arm to a support member of a video disc player (of the type described in U.S. Pat. No. 3,842,194) is described. In the magnetic coupling of the type described in Taylor, et al. patent, it is desirable to keep stray magnetic particles, present in the vicinity of the coupling, away from the mating surfaces of the support member and a connector plate secured to the stylus arm, to assure a rigid coupling therebetween.

The rigid coupling between the support member and the connector plate is particularly important where the support member is rendered subject to cyclical motion to correct velocity errors between the stylus and a record rotatably mounted in the player, to assure faithful transmission of cyclical motion. Reference may be made to U.S. Pat. No. 3,711,641 for an illustration of an "arm-stretcher" apparatus for rendering cyclical motion to the support member.

In accordance with the principles of the present invention, a first coupling element is secured to the stylus arm. A second coupling element is secured to the player. Both coupling elements are made from magnetizable materials. A permanent magnet is centrally mounted in a recess provided in the second coupling element. When the coupling elements are engaged, the separation between the permanent magnet and the first coupling element is greater than the separation between the permanent magnet and the walls defining the recess to assure that the greater magnetic flux is between the permanent magnet and the walls.

In the accompanying drawings:

FIG. 2 is a perspective view of a stylus arm unit housed in the cartridge of FIG. 1;

FIG. 3 is a perspective view of an arrangement used for suspending the stylus arm unit of FIG. 2 in the cartridge of FIG. 1;

FIG. 4 is a support member mounted in a carriage of the video disc player of FIG. 1 for engagement with a connector plate of the stylus arm unit of FIGS. 2 and 3;

FIGS. 5a and 5b illustrate two embodiments of an apparatus for moving an armstretcher apparatus located in the carriage for effecting engagement of the support member of FIG. 4 with the connector plate of FIGS. 2 and 3;

FIG. 6 illustrates a locked groove escape apparatus for moving a groove-riding stylus out of a locked groove of a record; and FIGS. 7-12 illustrate, a seriatim, operations involved in installing the cartridge in the carriage of the video disc player of FIG. 1; still another embodiment of the apparatus for moving the armstretcher apparatus located in the carriage being illustrated in FIGS. 7-12.

Figure 1:
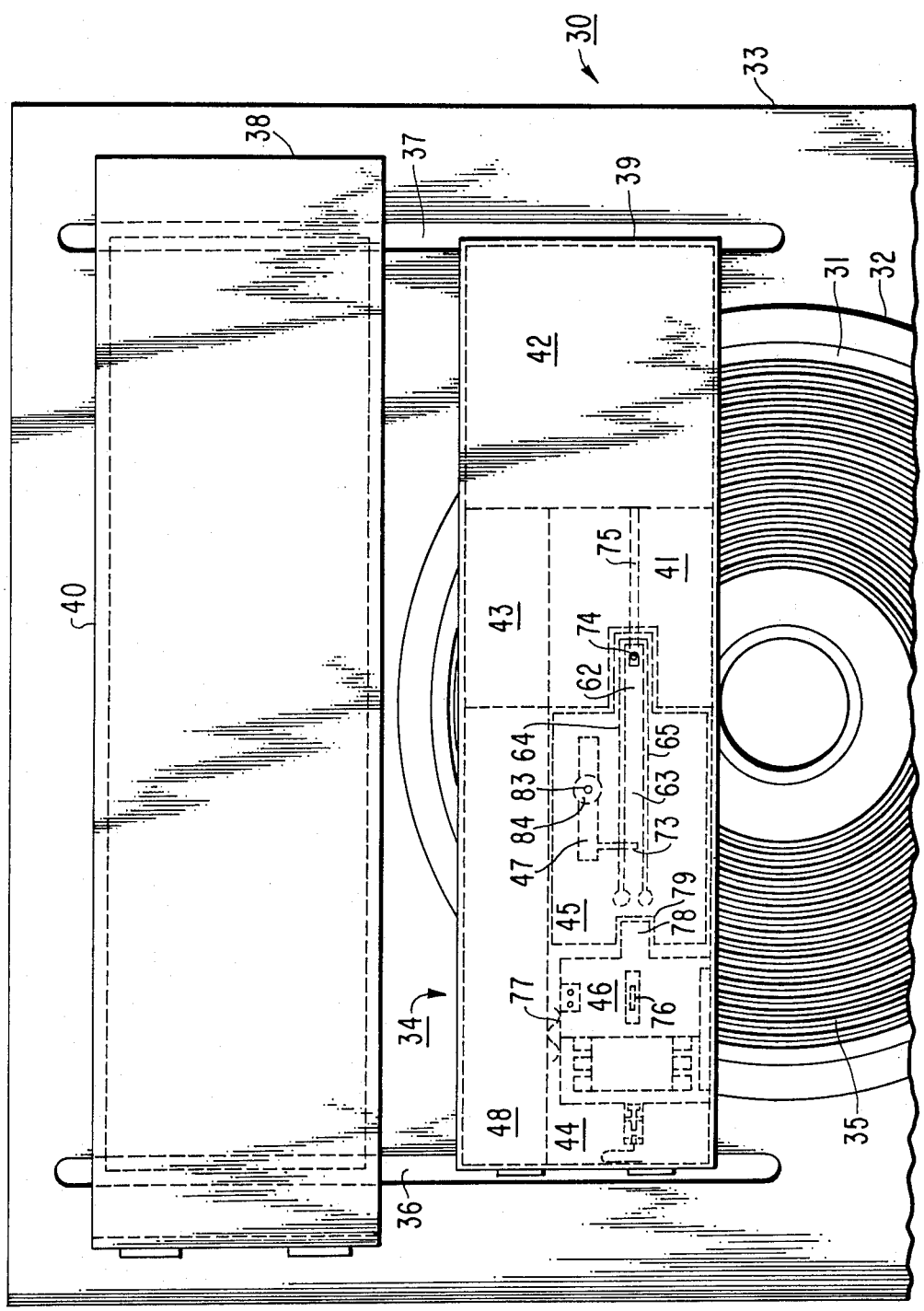
FIG. 1 is a video disc player incorporating the present invention.

In FIG. 1, numeral 30 indicates a video disc player of the general type shown in the U.S. Pat. No. 3,842,194 (Clemens). A record 31 is rotatably mounted for playback on a turntable 32 secured to a motorboard 33. A carriage 34 is mounted for a lateral motion relative to the motorboard 33 in correlation with lateral motion of a stylus 55 (FIG. 2) riding in a spiral-groove 35 disposed on the surface of the record 31 during playback. Slots 36 and 37 are provided in the motorboard 33 to permit lateral motion of the carriage 34 from an off-record rest position 38 to an above-record play position 39. Reference may be made to the U.S. Pat. No. 3,870,835 (Stave) for illustration of an apparatus for laterally driving the carriage 34 in correlation with the groove-riding stylus 55 during playback. When the carriage 34 is in the off-record rest position 38, a hinged plate 40 overlies the carriage.

There are five basic chambers in the carriage 34. Chambers 41, 42, and 43 are for enclosing respective circuit boards for respective elements of the signal processing circuitry of the playback system: (a) resonator (forming a tuned circuit with the stylus electrode/record capacitance), (b) oscillator (supplying UHF oscillations to the tuned circuit), and (c) preamplifier (responding to the detected version of modulated oscillations derived from the tuned circuit). Chamber 44 contains a replaceable pickup cartridge 45, a retractable armstretcher 46, and a stylus arm lifter 47. The armstetcher may be of the type shown in U.S. Pat. No. 3,711,641 (Palmer). Chamber 48 forms a wiring channel to hold the lead wires to the various circuit boards.

The cartridge 45 houses an insert molded stylus arm unit 50 shown in FIG. 2. The insert stylus arm unit 50 consists of a stylus arm 51 formed of an aluminum tube (e.g., 0.024 inch outer diameter and 0.002 inch thickness) with a plastic stylus holder 52 glued at one end of the stylus arm and a complaint member 53 molded at the other end of the stylus arm to connect the stylus arm with a metal connector 54. The compliant member 53 is in unstressed condition when it is aligned with the stylus arm 51. The angle between the stylus arm 51 and the connector plate 54 is 94° for reasons given subsequently. The plastic stylus holder 52 contains a slot to hold the stylus 55 when it is glued in place. A small projection 56 is molded at the top of the plastic stylus holder 52 to engage with an abutment 49 (FIG. 6) to relieve the stylus 55 from a locked groove of the record 31.

The arrangement for suspending the stylus arm unit 50 in the cartridge 45 will now be explained with reference to FIGS. 3 and 4. As shown in FIG. 3, a pair of elastic straps 57 and 58 are glued to the connector plate 54 of the stylus arm unit 50. The elastic straps 57 and 58 are secured to a pair of slanted bearing surfaces 59 and 60 provided at the rear end of the cartridge 45. The slanted rear bearing surfaces 59 and 60 establish an 8° angle between the connector plate 54 and a direction perpendicular to the bottom surface of the cartridge 45. FIG. 7 shows the slanted bearing surface 60.

The cartride 45 further includes a leaf spring 61, in the form of a conductive ribbon, for urging the stylus 55 into the record groove 35 during playback as shown in FIG. 12. One end of the leaf spring 61 is secured to the stylus 55 in electrical contact with an electrode included in the stylus. The other end of the leaf spring 61 is secured to the free end 62 of a cantilever beam 63. Slots 64 and 65

The cartridge 45 further includes a leaf spring 61, in the form of a conductive ribbon, for urging the stylus 55 into the record groove 35 during playback as shown in FIG. 12. One end of the leaf spring 61 is secured to the stylus 55 in electrical contact with an electrode included in the stylus. The other end of the leaf spring 61 is secured to the free end 62 of a antilever beam 63. Slots 64 and 65 in the top wall of the cartridge 45, as shown in FIG. 1, allow a strip-like portion of the top wall to function as the cantilever beam. While in this particular embodiment the cantilever beam 63 is integral with the cartridge 45, it could be separately secured to the top wall of the cartridge.

The location of the free end 62 of the cantilever beam 63 with respect to the bottom surface of the cartridge 45, and the configuration of the leaf spring 61, are such that the stylus arm 51 is retained in a retracted position within the cartridge for protection (FIG. 8). The retracted position provides a location for the stylus 55 withdrawn within the confines of the cartridge 45 remote from an opening in the bottom surface of the cartridge through which the stylus protrudes when the carriage 34 is in the off-record rest position 38 (FIG. 11) and the above-record play position (FIG. 12).

When the cartridge 45 is outside the player (FIG. 7), or when inside the player but not engaged with the armstretcher 46 (FIG. 8), the stylus arm 51 is held in a retracted position in the cartridge for protection. In either of these positions, the compliant member 53 is not bent or stressed, and therefore the formation of a permanent "set" in the compliant member, which could cause mistracking of the stylus 55 during playback, is prevented.

FIGS. 7-12 illustrate, a seriatim, operations involved in installation of the cartridge 45 in the carriage compartment 44. From FIG. 7, it can be seen that armstretcher 46 has a support member 64 for engagement with the connector plate 54 of the cartridge 45 during containment thereof in the carriage compartment 44. The armstretcher 46 is slidably mounted in the carriage compartment 44 for movement between a withdrawn position when a lid 65 of the carriage is open (FIG. 7) and an advanced position when the carriage lid is closed (FIGS. 10-12) in response to the motion of the carriage lid. A coil spring 66 connected between the armstretcher 46 and the carriage 34 returns the armstretcher to the withdrawn position when the carriage lid 65 is opened.

An apparatus for traversing the armstretcher 46 in the carriage compartment 44 to effect rigid engagement between the support member 64 and the connector plate 54 is shown in FIG. 5a. A cam 67 is mounted in the carriage 34 for rotation about a pivot pin P in response to the motion of the carriage lid 65. The peripheral surfaces of the cam 67 engage the armstretcher 46 to cause relative displacement between the armstretcher and the carriage 34. A portion 68 in the armstretcher 46 is relieved to permit a small amount of overtravel by the cam 67. Further, relief 68 helps to spring load the armstretcher 46 against the cartridge 45, when the carriage lid 65 is closed, to assure accurate positioning of the cartridge in the carriage compartment. Additionally, the relief 68 tolerates a slight variation in the dimensions of the armstretcher 46, cartridge 45, amd the carriage compartment 44.

The operation of another embodiment of the apparatus for moving the armstretcher 46 in the carriage compartment 44 to effect rigid engagement between the support member 64 and the connector plate 54 can be seen from FIG. 5b. The operation of the moving apparatus of FIG. 5b is similar to the moving apparatus of FIG. 5a except that in the moving apparatus of FIG. 5b the return spring 66 is not required. In the moving apparatus of FIG. 5b, the carriage lid 65 and the cam 67 are fixedly secured to a pivot pin which is rotatably mounted in the carriage 34. When the carriage lid 65 is opened, the cam 67 is rotated to retract the armstretcher 46 to the withdrawn position.

The operation of still another embodiment of the apparatus for moving the armstretcher 46 in the carriage compartment 44 to effect rigid engagement between the support member 64 and the connector plate 54 can be seen from FIGS. 8-12.

The cartridge 45 is placed in the carriage compartment 44 as shown in FIG. 8, and the carriage lid 65 is closed. The carridge 45 overlies the stylus arm lifter 47 during containment of the cartridge in the carriage compartment 44.

Figure 9:
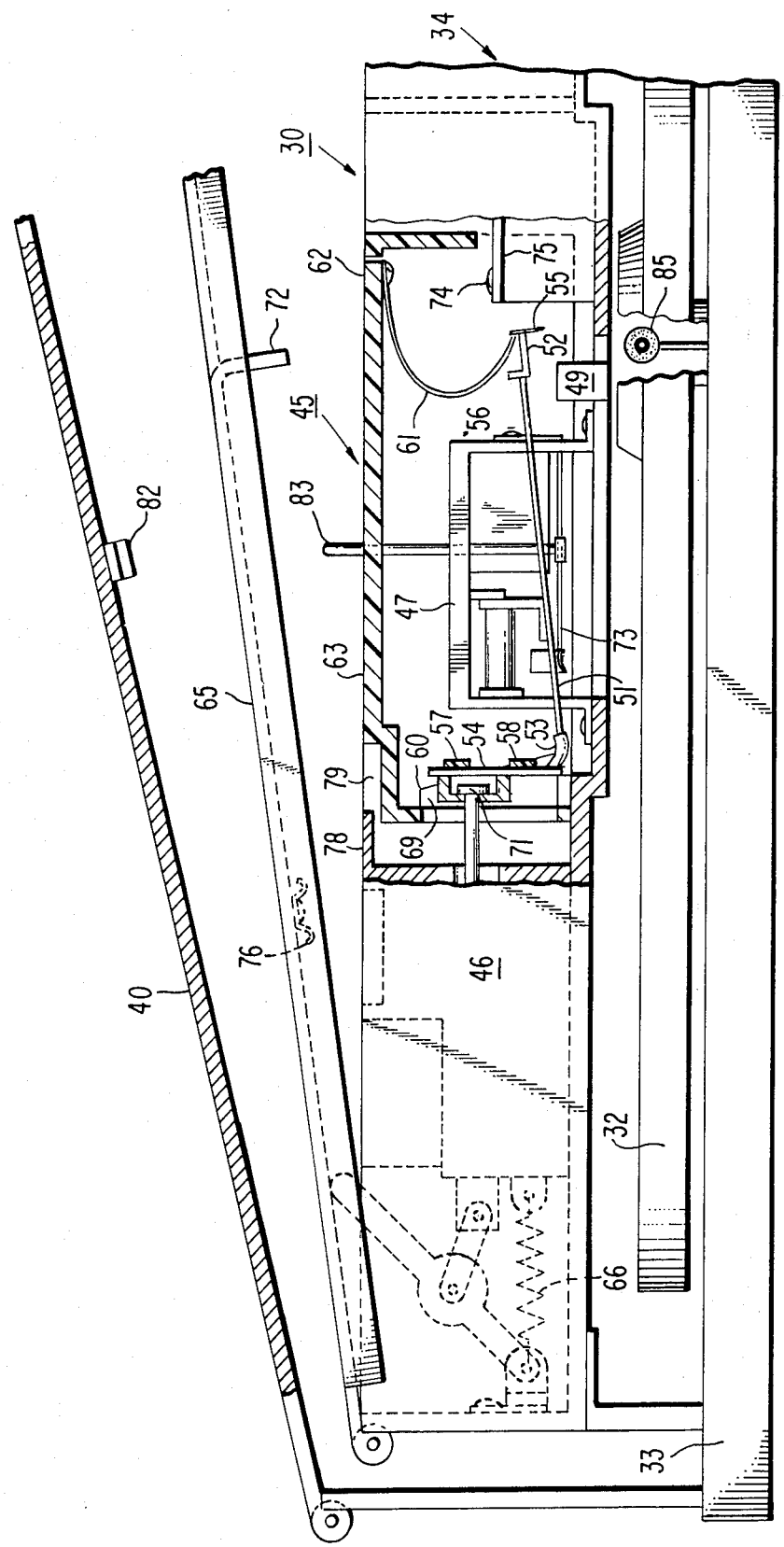

The support member 64 enters the interior of the cartridge 45 through an opening 69 at the rear end of the cartridge for engagement with the connector plate 54 as shown in FIG. 9. As the armstretcher moves forward, the support member 64 moves the connector plate 54 from the initial tilted position (e.g., 8° as shown in FIG. 8) to a position matching the engaging surface of the support member (e.g., perpendicular to the bottom surface of the cartridge 45 as shown in FIG. 9). The elastic straps 57 and 58 permit the connector plate 54 to assume the new orientation.

The connector plate 54 is made from magnetizable material. The support member 64 is also magnetizable. The support member 64 has walls defining recess 70 as shown in FIG. 4. A permanent magnet 71 is centrally mounted in the recess 70. The flux of the permanent magnet 71 secures the connector plate 54 to the support member 64 for rigidly transmitting cyclical motion of the support member to the connector plate during the support member/connector plate engagement. The separation between the permanent magnet 71 and the connector plate 54 is made greater than the separation between the permanent magnet and the walls of the support member 64 so that the strongest magnetic field is in the annular cavity. The magnetic field in the annular cavity attracts any stray magnetic particles present in the vicinity away from the mating surfaces of the connector plate 54 and the support member 54. Such an arrangement assures rigid connection between the support member 64 and the connector plate 54.

Figure 10:
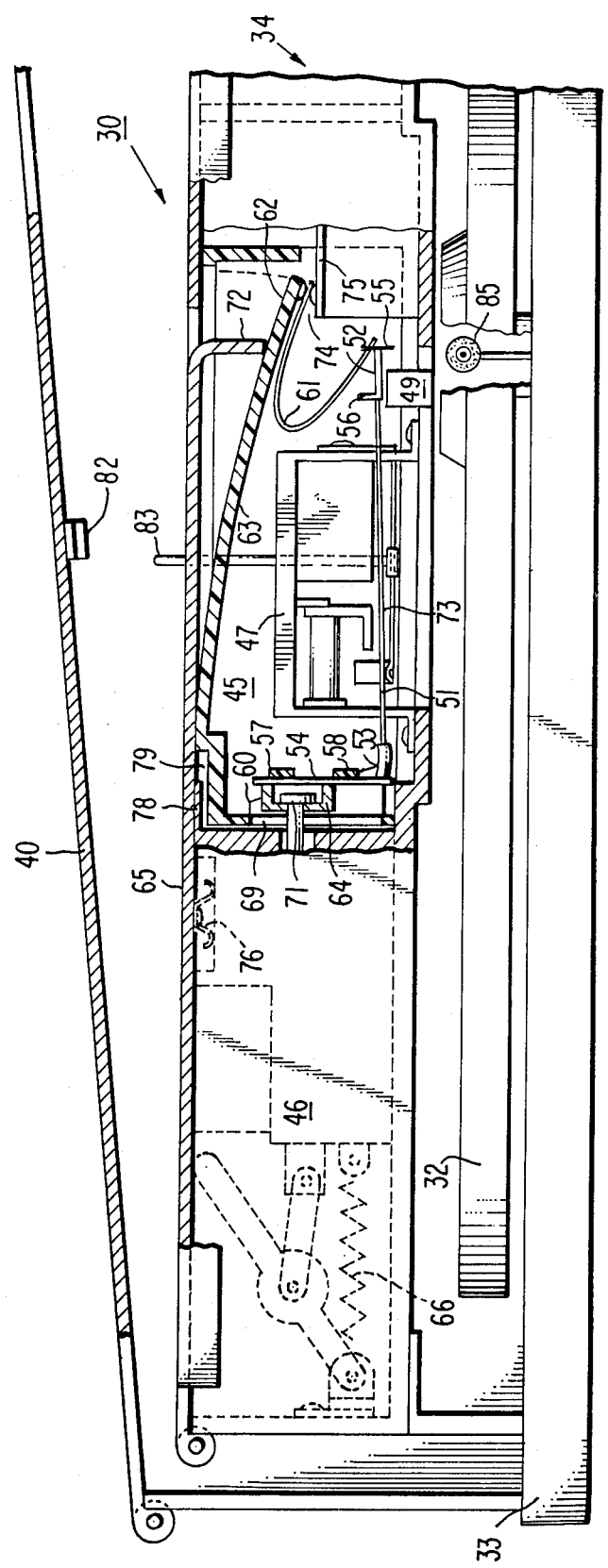

As the carriage lid 65 is closed further, a defeat lever 72 depresses the free end 62 of the cantilever beam 63, as shown in FIG. 10. This lowers the leaf spring 61 to allow the stylus arm 51 to rest on a control rod 73 of the stylus arm lifter 47.

The end of the leaf spring 61 affixed to the cantilever beam 63 is urged against a contact rivet 74 provided on a resonator circuit board 75 to establish an electrical path between the stylus electrode and the signal processing circuit via the leaf spring.

When the carriage lid 65 is closed, a spring 76, secured to the carriage lid, presses the armstretcher 46 down into the carriage compartment 44 to establish proper seating of the armstretcher as shown in FIG. 10. From FIG. 1, it can be seen that a spring 77, secured to the carriage compartment 44, presses the armstretcher 46 against the side wall of the carriage compartment to assure lateral alignment of the armstretcher.

The engagement of the defeat lever 72 with the cartridge 45 assures proper seating of the cartridge in the carriage compartment 44. In order to assure lateral alignment of the rear of the cartridge 45 with the armstretcher 46, the armstretcher has a projection 78 which enters a recess 79 provided in the rear end of the cartridge during relative motion between the armstretcher and the cartridge as shown in FIG. 1.

Further, in order to assure lateral alignment of the front end of the cartridge 45 with the contact rivet 74, the cartridge has a cavity at the front end for receiving a portion provided in a structure associated with the resonator circuit board 75 during relative motion between the cartridge and the carriage 34.

When the hinged plate 40 is closed, a projection 82 depresses a plunger 83 connected to the rod 73 of the stylus arm lifter 47. An aperture 84 is provided at the top of the cartridge 45 to permit passage of the plunger 83 as shown in FIG. 1.

Figure 11:
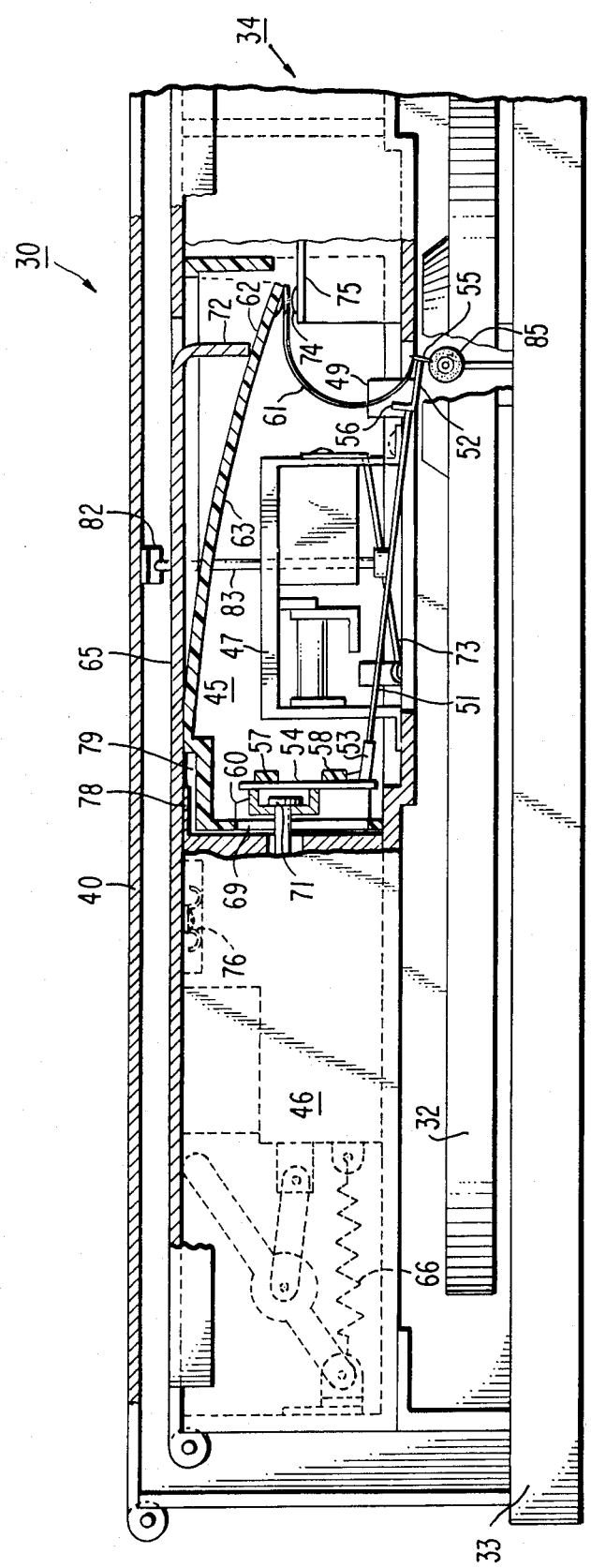

When the carriage 34 is in the off-record rest position 38 under the plate 80, the plunger 83 depresses the stylus arm lifter 73 as shown in FIG. 11 and the stylus rests on a stylus brush 85. Further, when the carriage 34 moves from the off-record rest position 38 to the above-record play position 39, the stylus arm lifter rod 73 lifts the stylus arm 51 as depression of the plunger 83 is no longer obtained by the projection 82. Again, when the carriage 34 reaches the above-record play position 39, the stylus arm lifter 47 is activated to permit the stylus 55 to rest on the record 31.

The stylus arm lifting/lowering arrangement may be of the type disclosed in a copending U.S. application Ser. No. 667,309, of Leedom, et al., entitled "STYLUS ARM LIFTING/LOWERING APPARATUS FOR A VIDEO DISC PLAYER," filed concurrently herewith.

When the stylus 55 is resting on the stylus brush 85 or the record 31, the compliant member is not bent or stressed. This feature prevents formation of a set in the compliant member during containment of the cartridge 45 in the carriage compartment 44. Thus, compliant member is in unstressed condition while the cartridge is outside the carriage compartment, and also while the cartridge is contained in the carriage compartment and the carriage is in the off-record position or in the above-record play position. The compliant member is stressed only in the interval between the off-record rest position and the above-record play position of the carriage (FIG. 10) as the stylus arm is lifted to permit the stylus to clear the outside bead of the record. This interval is so short, that it has no noticeable effect on the "set" of the compliant member.

An aperture in the outer wall of the cartridge 45 permits passage of wiring between the stylus arm lifter 47 and the wiring channel 48. The cartridge 45 is provided with inner walls closely flanking the stylus arm unit 50 to limit access thereto. The keyed end shape and the solid cover of the cartridge 45 prevents backward or inverted insertion of the cartridge into the stylus housing compartment 44.

What is claimed is:

1. In a system for playing back prerecorded signals from a spirally grooved record; said system including a support element; said system further including a stylus arm carrying a stylus at one end thereof; an apparatus comprising:
    A. a first substantially flat magnetizable coupling element secured to the other end of said stylus arm;
    B. a second magnetizable coupling element secured to said support element, and subject to a releasable engagement with said first magnetizable coupling element; wherein said second coupling element has magnetizable walls defining a recess; and
    C. a permanent magnet mounted in said recess with a separation from said walls such that it forms an annular cavity with said magnetizable walls; the dimensions of said permanent magnet relative to the wall dimensions being such that a gap between said permanent magnet and said first coupling element is established, during said engagement between said coupling elements, which provides a separation between said permanent magnet and said first magnetizable coupling element that is greater than the separation between said permanent magnet and said magnetizable walls.

2. An apparatus as defined in claim 1 further comprising:
    A. a cartridge having walls defining a protective enclosure for said stylus and said stylus arm; wherein said cartridge is subject to reception in a compartment provided is said support element;
    B. means mounted in said cartridge for flexibly suspending said first coupling element within said cartridge at a location permitting alignment thereof with said second coupling element when said cartridge is received in said compartment; and
    C. means for displacing said second coupling element relative to said support element to effect said engagement between said coupling elements upon receipt of said cartridge in said compartment.

3. An apparatus as defined in claim 2 further including:
    means mounted in said cartridge for releasably retracting said stylus arm within the confines of said cartridge remote from an opening in said cartridge through which said stylus may otherwise protrude; and
    means secured to said support element for defeating said releasable retracting means for permitting protrusion of said stylus through said opening when said cartridge is received in said compartment and when said coupling elements are in engagement.

4. An apparatus as defined in claim 3 wherein a compliant member secures said first coupling element to said stylus arm; wherein said suspending means establishes a first angular orientation of said first coupling element with respect to said cartridge such that, when said stylus arm is held in said retracted position in said cartridge, said compliant member is unstressed while said first coupling element occupies said first angular orientation.

5. In a system for playing back prerecorded signals from a spirally grooved record disposed on a turntable rotatably mounted with respect to a base of said playback system; said system including a carriage mounted for lateral motion relative to said base in correlation with lateral motion of a groove-riding stylus during playback; a compartment provided in said carriage; a stylus arm carrying said stylus at one end thereof; and a support member located within said carriage; an apparatus comprising:
    A. a first coupling element secured to the other end of said stylus arm;
    B. a cartridge having walls defining a protective enclosure for said stylus and said stylus arm; wherein said cartridge is subject to reception in a compartment;
    C. means mounted in said cartridge for flexibly suspending said first coupling element within said cartridge; wherein said suspending means establishes a location of said first coupling element permitting alignment thereof with said support member when said cartridge is received in said compartment;

D. means mounted in said carriage for imparting translatory motion to said support member during playback for opposing cyclical deviations in stylus/record relative velocity from a predetermined speed; wherein said translatory motion imparting means is movably mounted in said carriage;

E. a lid secured to said carriage for motion between an open position and a shut position; and F. means, responsive to motion of said carriage lid from said open position to said shut position and mounted in said carriage, for providing displacement of said translatory motion imparting means toward said cartridge receiving compartment to effect a releasable engagement between said support member and said first coupling element during containment of said cartridge in said compartment permitting rigid transmission of said translatory motion from said support member to said stylus.

* * * * *

UNITED STATES PATENT OFFICE
CERTIFICATE OF CORRECTION

PATENT NO. : 4,040,635

DATED : August 9, 1977

INVENTOR(S) : MARVIN ALLAN LEEDOM

It is certified that error appears in the above-identified patent and that said Letters Patent are hereby corrected as shown below:

Column 2, line 28      After "insert" insert --molded--

Column 2, lines 54-61      Delete lines 54-61

Signed and Sealed this

Tenth Day of October 1978

[SEAL]

Attest:

RUTH C. MASON
*Attesting Officer*

DONALD W. BANNER
*Commissioner of Patents and Trademarks*